United States Patent
Adolph et al.

(12) 
(10) Patent No.: US 6,370,323 B1
(45) Date of Patent: *Apr. 9, 2002

(54) DIGITAL VIDEO DISC DECODER INCLUDING COMMAND BUFFER AND COMMAND STATUS POINTERS

(75) Inventors: Paul D. Adolph, San Jose; Moshe Molcho, Sunnyvale; Joseph R. Wild, Santa Clara, all of CA (US)

(73) Assignee: LSI Logic Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,807

(22) Filed: Apr. 3, 1997

(51) Int. Cl.[7] .................................................. H04N 5/91
(52) U.S. Cl. ...................... 386/104; 386/125; 386/126
(58) Field of Search .............................. 386/46, 95, 96, 386/104, 105, 111, 112, 125, 126; 714/805; 719/213; 369/32; 345/168

(56) References Cited

U.S. PATENT DOCUMENTS

| | | | |
|---|---|---|---|
| 4,831,367 A | * 5/1989 | Baus | 345/168 |
| 5,276,662 A | * 1/1994 | Shaver, Jr. et al. | 369/32 |
| 5,309,567 A | 5/1994 | Mizukami | 395/325 |
| 5,598,514 A | 1/1997 | Purcell et al. | 395/118 |
| 5,732,094 A | * 3/1998 | Petersen et al. | 714/805 |
| 5,907,658 A | * 5/1999 | Murase et al. | 386/125 |
| 5,915,092 A | * 6/1999 | Morita et al. | 709/213 |

* cited by examiner

*Primary Examiner*—Huy Nguyen
(74) *Attorney, Agent, or Firm*—Christopher P. Maiorana, P.C.

(57) ABSTRACT

An audio and video decoder for decoding audio, video and sub-picture streams in a disc player. The audio and video decoder has associated therewith a memory for storing commands and status information for each command. The audio and video decoder is responsive to commands received from a host to control audio and video decoding processes. The audio and video decoder includes a host interface and a command processor. The command processor includes a transfer mechanism for transferring commands received at a command buffer in the memory to a command FIFO in the memory and a status monitor for tracking an execution status of each command stored in the command FIFO and for updating a status word which is stored along with each command in the command FIFO. The command processor returns a pointer to the host for a unique address in memory for the status word for each command stored in the command FIFO.

11 Claims, 10 Drawing Sheets

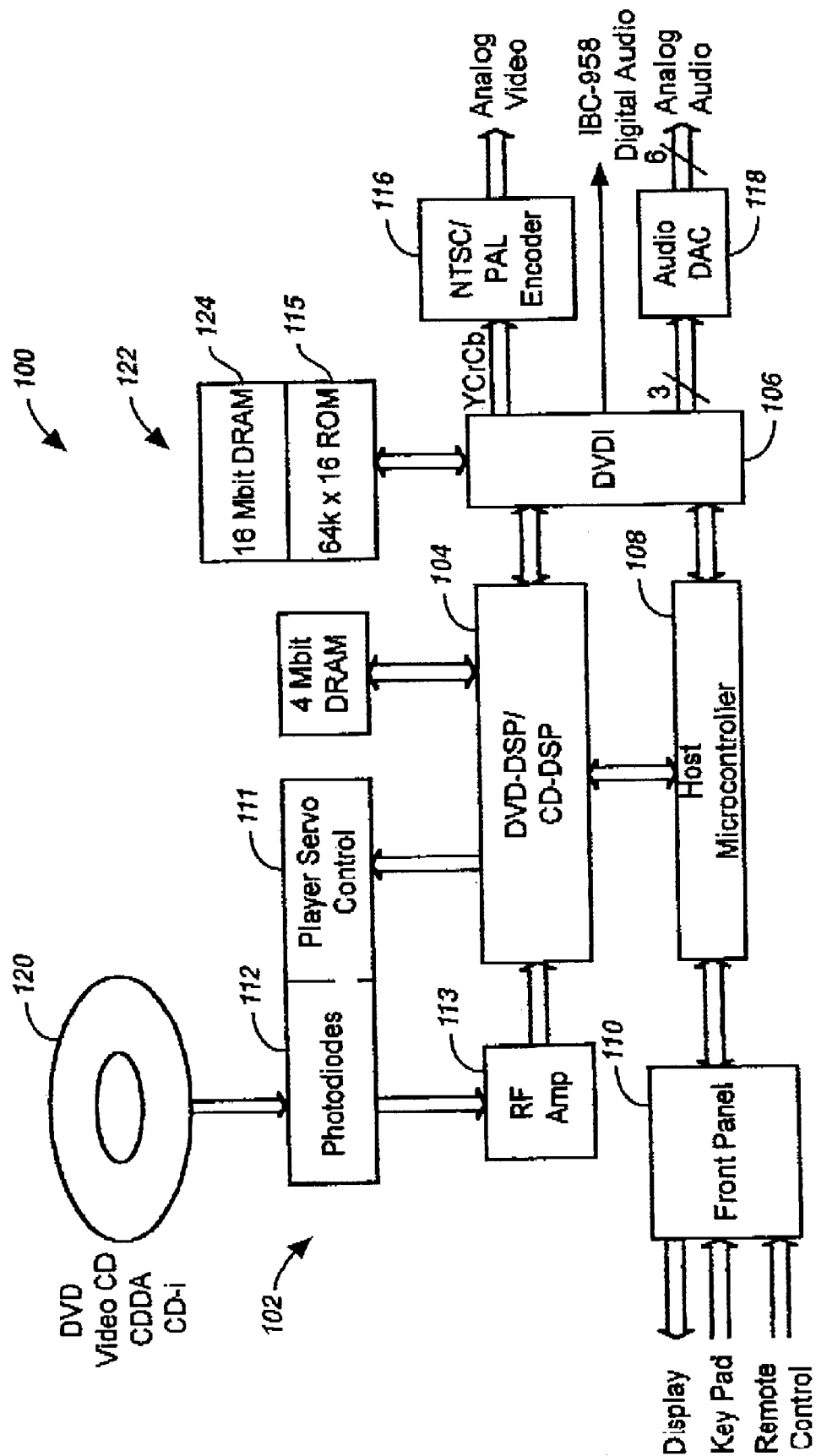
FIG._1

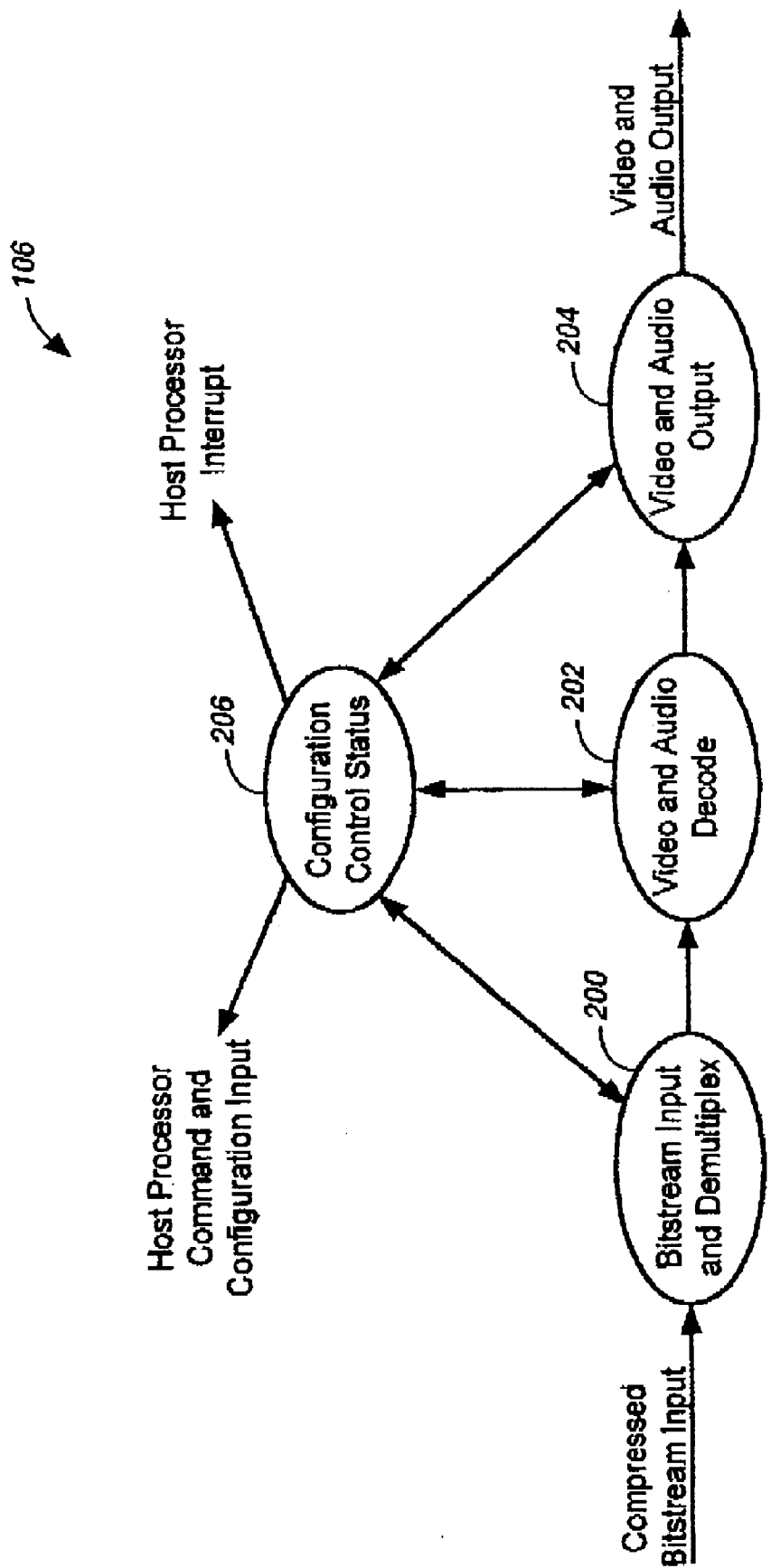
FIG._2

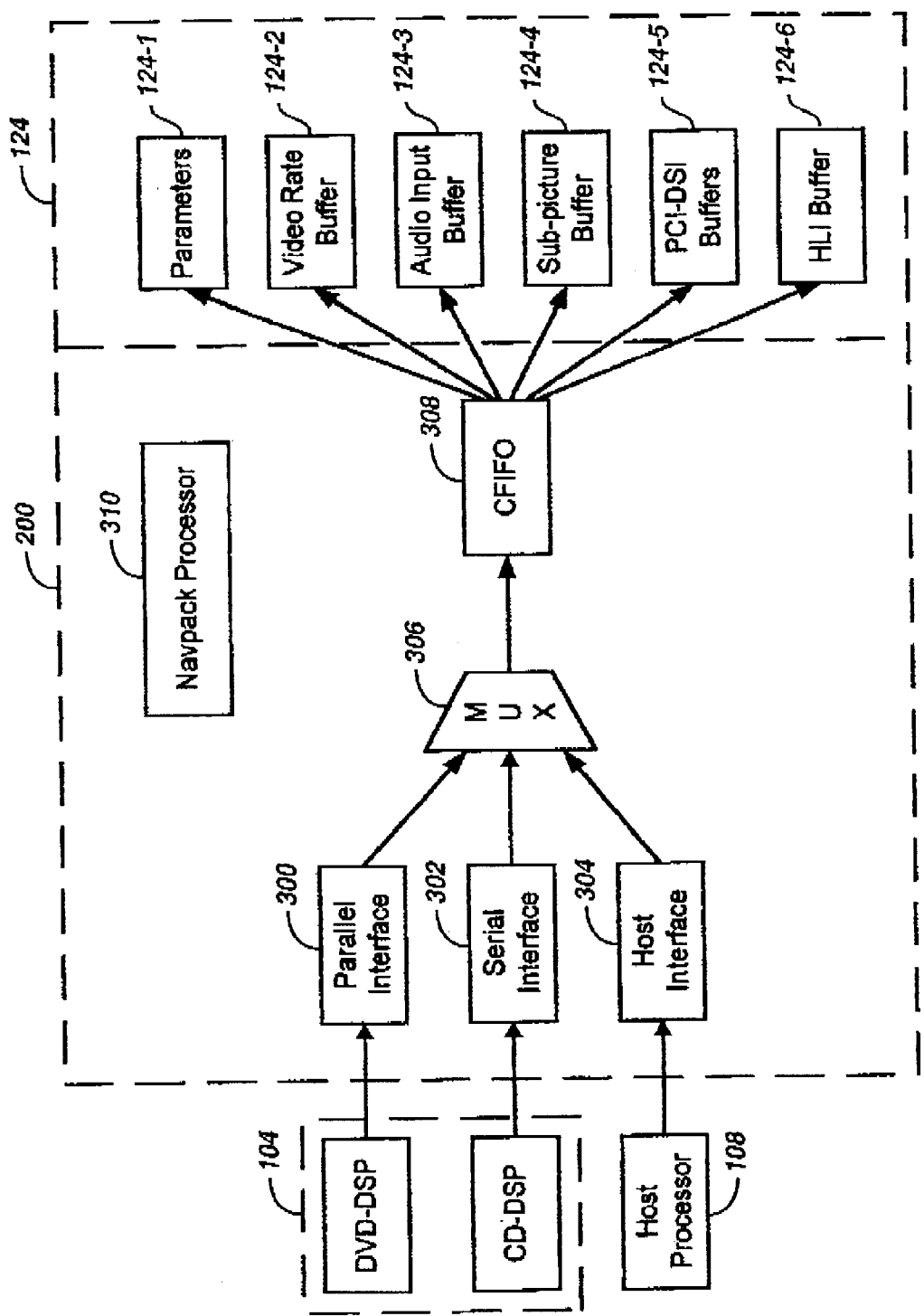
FIG._3

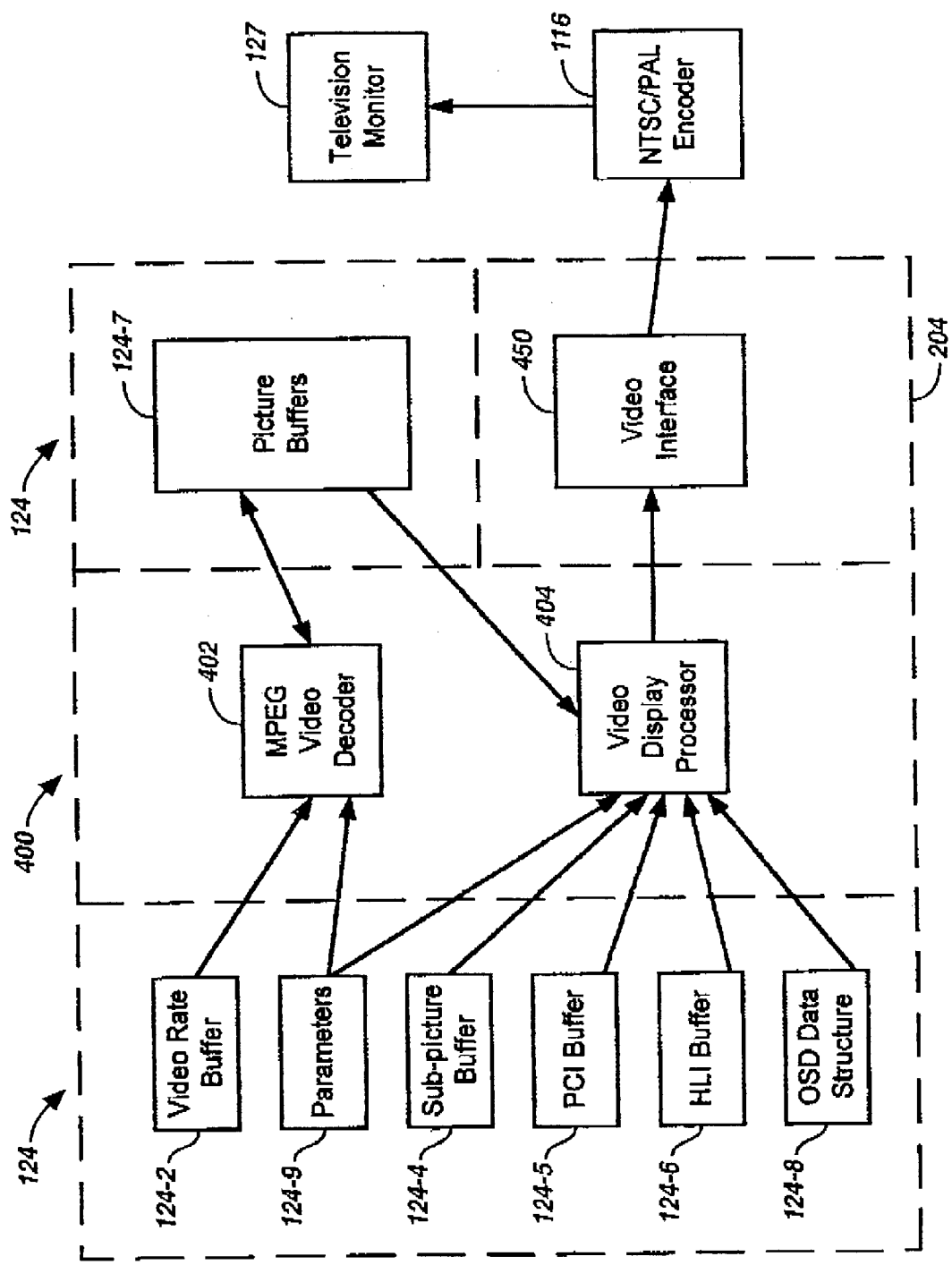
FIG._4

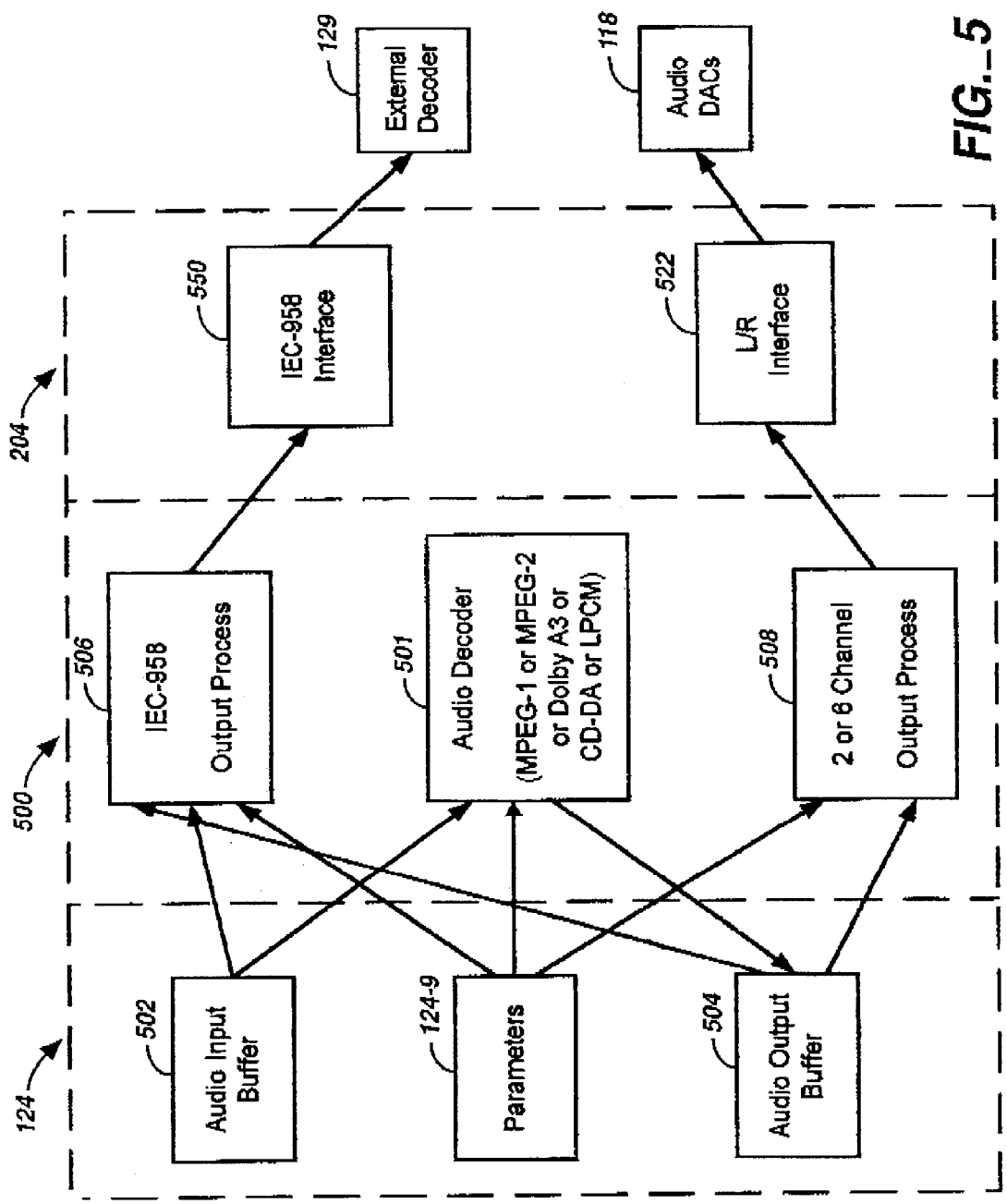
FIG._5

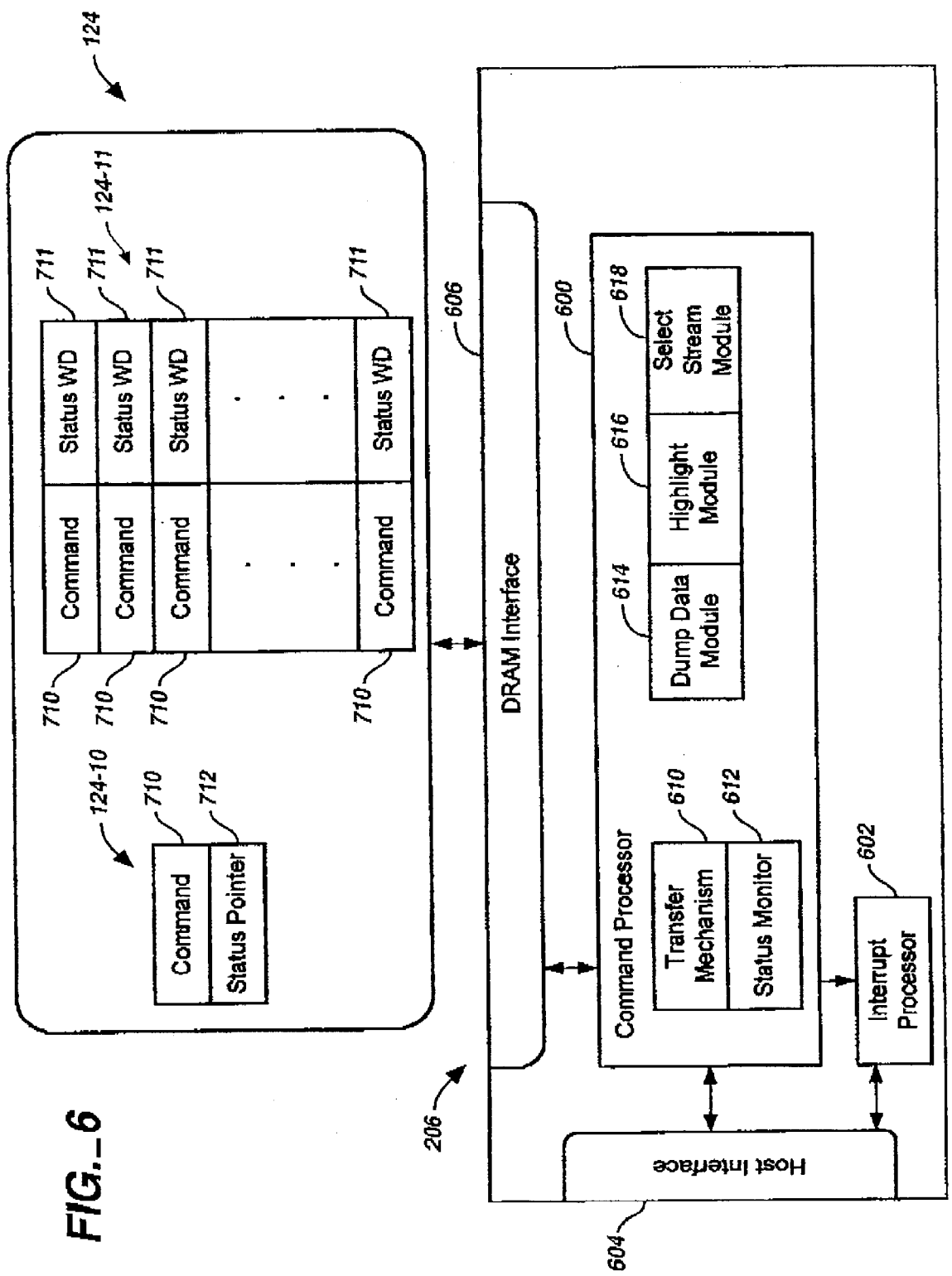

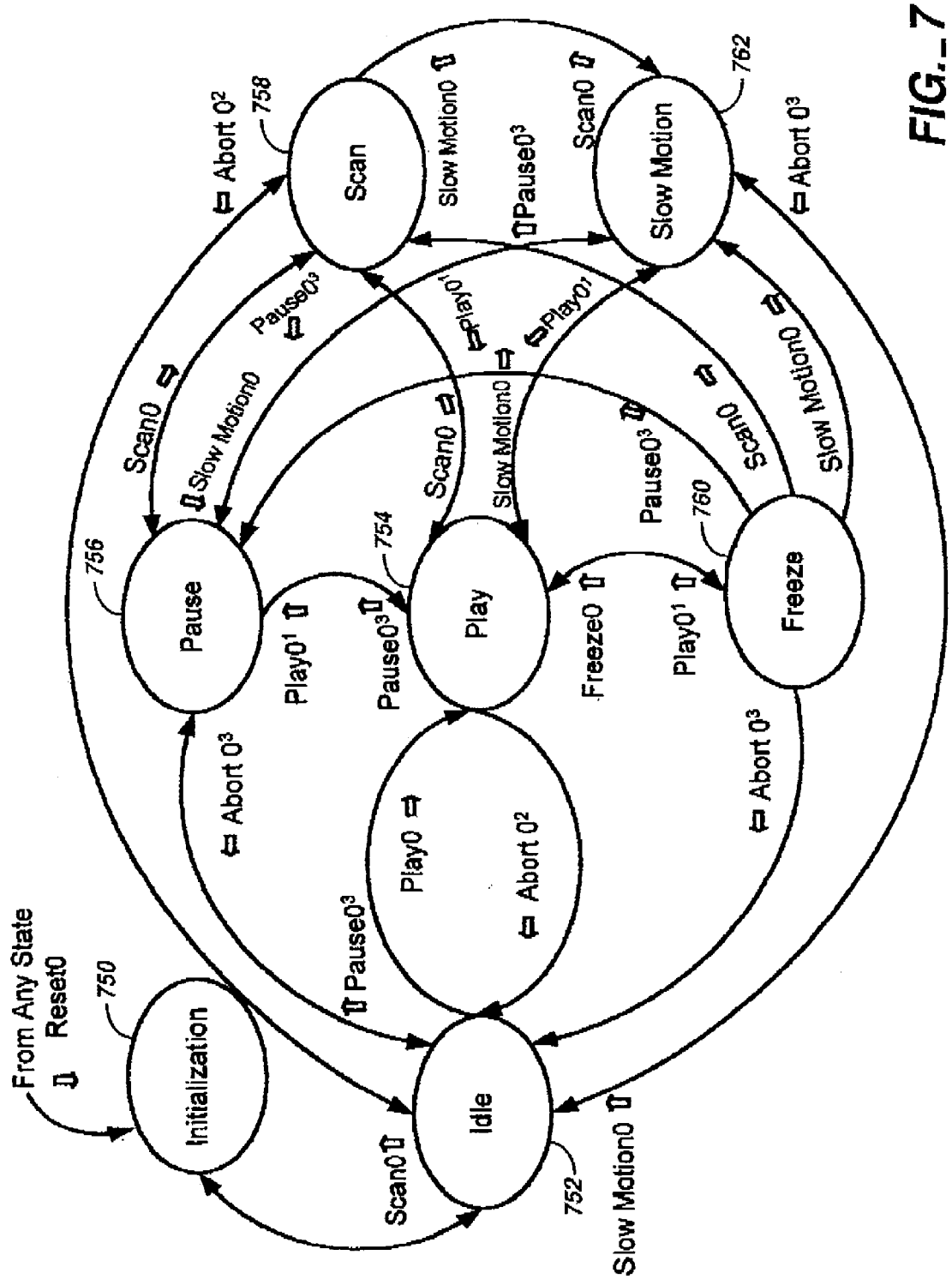
FIG._7

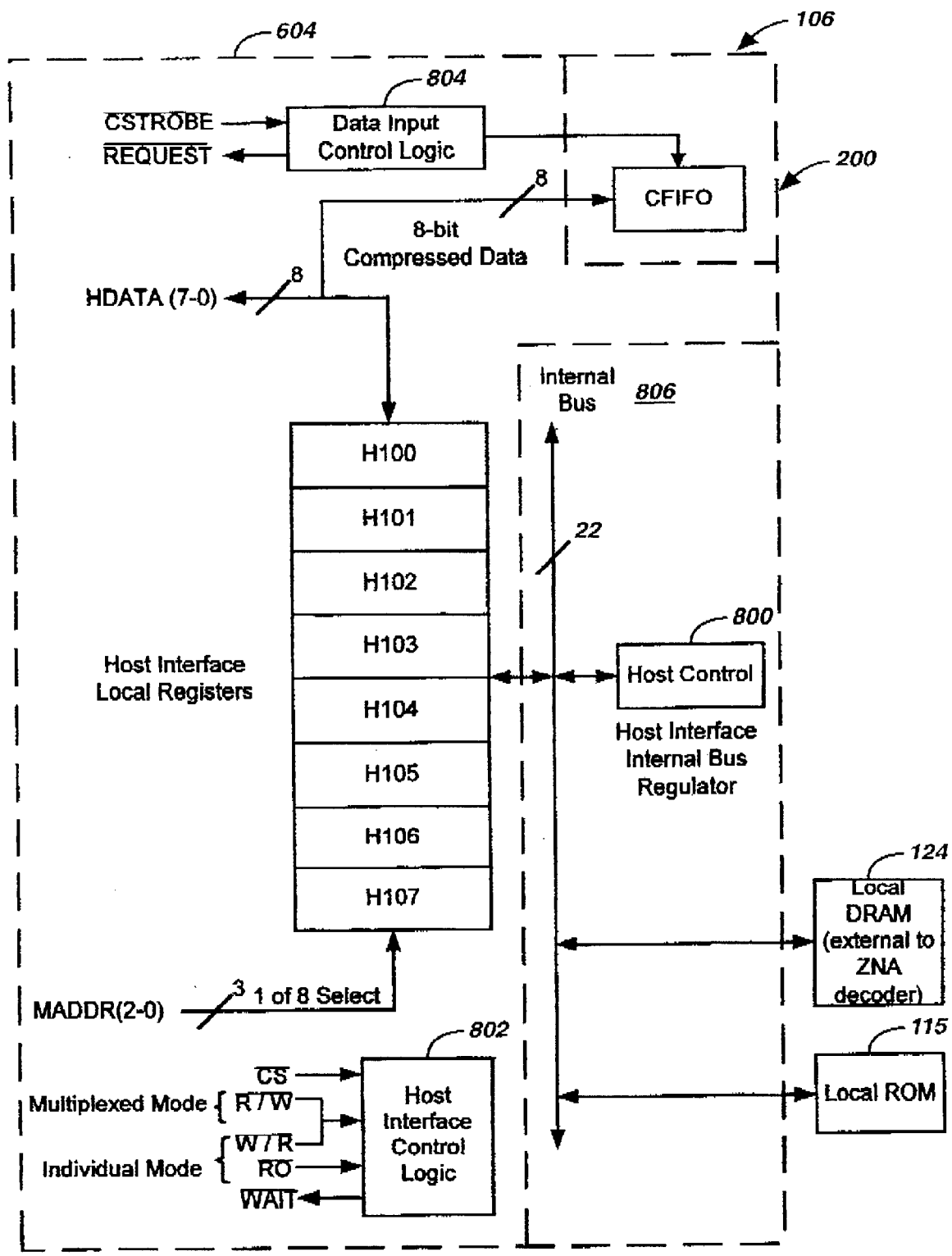
FIG._8

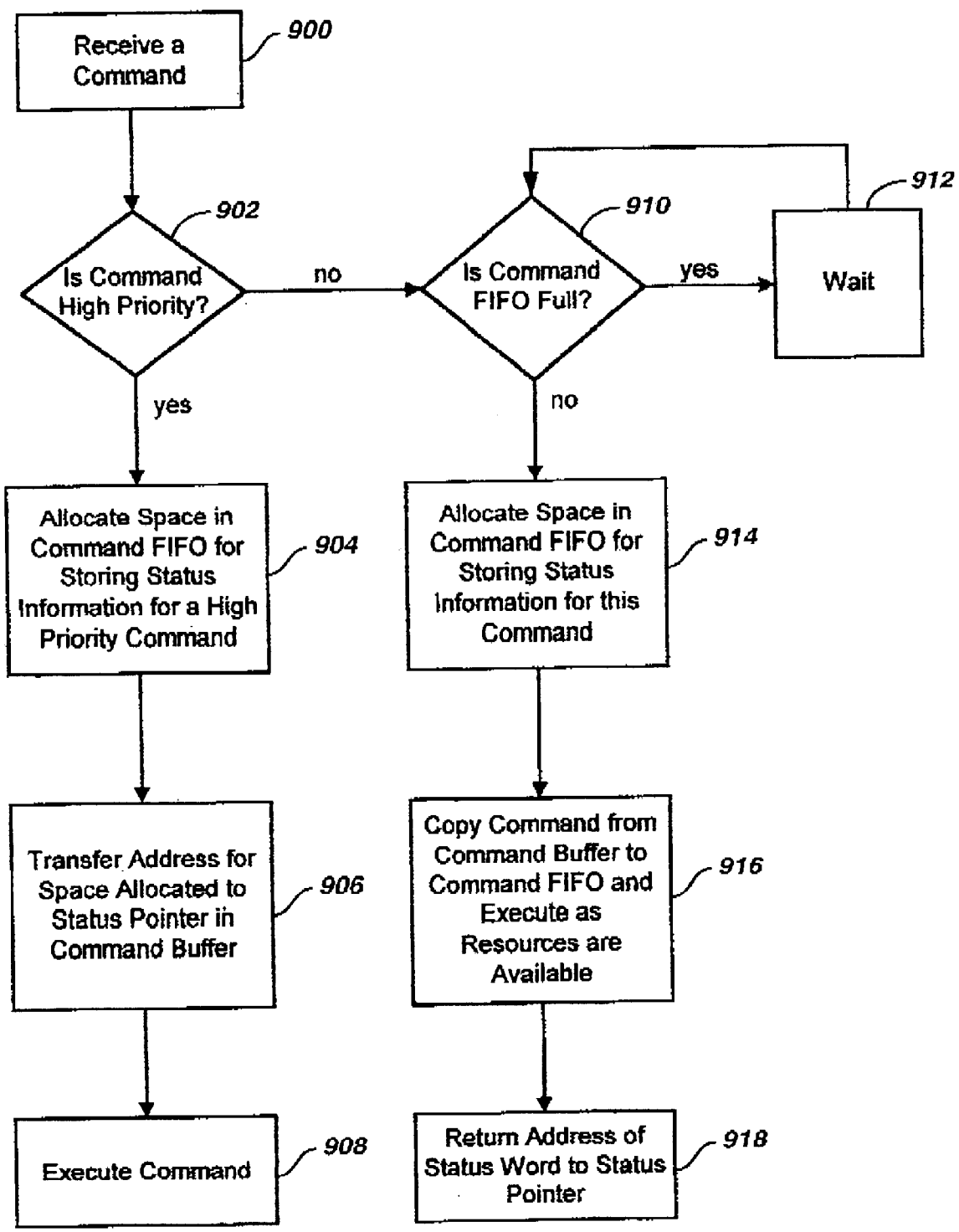
FIG._9

| Memory Address | Description |
| --- | --- |
| 0x40 - 0x5F | Command Buffer |
| 0x60 - 0x7B | Memory Parameters |
| 0x7C - 0xA7 | Video Parameters |
| 0xA8 - 0xDF | Error Concealment Parameters |
| 0xE0 - 0x10F | Audio Parameters |
| 0x110 - 0x10F | Dolby Digital (AC-3) Parameters |
| 0x1A0 - 0x1FF | Play Mode Parameters |
| 0x200 - 0x21B | Host Parameters |
| 0x21C - 0x29F | Pointers |
| 0x2A0 - 0x39F | Status Area |
| 0x3A0 - 0x45F | Bitstream Parameters |
| 0x460 - 0x47F | Semaphores |

FIG._10

DIGITAL VIDEO DISC DECODER INCLUDING COMMAND BUFFER AND COMMAND STATUS POINTERS

This invention relates generally to disc players and, more specifically, to a digital video disc decoder.

BACKGROUND

Digital Video Disc (DVD) or, as it is sometimes called, Digital Versatile Disc, is a new medium for the distribution of from 4.7 to 17 billion bytes of digital data on a 120-mm (4.75 inch) disc. This huge volume of data (today's CD can store only 680 million bytes of data) can be used to store up to nine hours of studio quality video and multi-channel surround-sound audio, highly interactive multimedia computer programs, 30 hours of CD-quality audio, or anything else that can be represented as digital data.

A DVD looks exactly like today's CD: it is a silvery platter, 4.75 inches in diameter, with a hole in the center, except that information can be stored on both sides. Like a CD, data is recorded on the disc in a spiral trail of tiny pits, and the discs are read using a laser beam. A DVD is made up of a reflective aluminum foil encased in clear plastic. The pits are formed in the foil by stamping it with a glass master. In the case of a single-sided DVD, the stamped disc is backed by a dummy, which may contain graphics advertising the contents of the disc. For a double-sided disc, two halves, each with their foil full of data, are bonded back to back. The DVD's larger capacity is achieved by making the pits smaller and the spiral tighter, and by recording the data in as many as four layers, two on each side of the disc.

A DVD player includes a disc reader mechanism for retrieving data from a DVD disc, an audio/video decoder for decoding the retrieved data and transforming the audio and video data into a desired output format and a controller for processing user commands and controlling the operation of the player. Typically, user input for controlling the operation of the player is provided from either a remote control or front panel of the player. In turn, the controller translates the user input into commands for execution by the various components of the DVD player. The controller may issue a plurality of commands based on a single user input.

SUMMARY OF THE INVENTION

In general, in one aspect, the invention provides a method of executing commands provided by a host to a decoder in a disc player, the method including the steps of receiving a first command from the host. Thereafter, the decoder determining whether the first command is a high priority command. If the first command is a high priority command, then the first command is immediately executed and a pointer to a location in a memory at which status information relating to the first command resides is returned to the host. The decoder is disabled from receiving any more high priority commands until the execution of the first command is complete.

If the first command is not a high priority command, then the first command is stored in a command and status buffer in the memory. The decoder allocates space in the command and status buffer to store a command status word whose value is representative of a current status of processing of the first command by the decoder. The decoder determines if the command and status buffer is full, and if not, returns to the host a status address associated with the command status word. If the command and status buffer is full, the decoder disables the receipt of any new commands until the command and status buffer has enough room to store at least one new command.

Preferred embodiments of the invention include the following features. The step of receiving a first command includes receiving an interrupt from the host and upon receiving the interrupt the decoder immediately determines whether the command is a high priority command. The command and status buffer is sized to store at least two commands. The step of receiving the first command includes loading the first command into a command buffer. The step of returning to the host the status address includes writing the status address to the command buffer, thereby enabling the host to issue a new command. The step of disabling the decoder from receiving more commands includes a step of delaying the return of the status address to the host until the command and status buffer has room to store a new command.

In another aspect, the invention provides a method of executing commands by a decoder in a disc player, the commands transferred by a host through a host interface to the decoder, the decoder including a memory for storing selected ones of the commands and status information associated therewith, the method including the step of receiving a plurality of commands and storing selected ones of the commands in a command and status buffer. The decoder allocates space in the command and status buffer to store a command status word representative of an execution status of each command stored therein. A pointer is returned to the host representing the location in memory for the command status word for each command prior to accepting a new command from the host. The decoder monitors the execution status of each command and updates the command status word for each command. Each command is executed from the command and status buffer according to the order in which it is received.

Preferred embodiments of the invention include the following features. The step of storing includes storing only low priority commands in the command and status buffer. The decoder immediately executes high priority commands upon receipt. The receiving step includes loading each command from the host into a command buffer. The step of returning a pointer to the host includes writing the pointer to the command buffer wherein the command buffer is readable by the host.

In another aspect, the invention provides an audio and video decoder for decoding audio and video streams, the audio and video decoder responsive to commands received from a host to control audio and video decoding processes, the audio and video decoder including a host interface and a command processor. The command processor is for storing in a command buffer in a memory associated with the audio and video decoder each command as it is received from a host through the host interface. In additon the command processor transfers selected ones of the commands received at the command buffer into a command and status buffer in the memory which is sized to store more than one command and allocates space in the command and status buffer to store a command status word representative of the execution status of each command stored therein. Finally, the command processor returns a pointer to the host representing a location in memory for the command status word for each command before accepting a new command from the host and monitors the execution status for each command and updates the command status word for each command. The command processor executes each command from the command and status buffer according to the order in which it is received.

In another aspect, the invention provides an audio and video decoder for decoding audio, video and sub-picture streams in a disc player. The audio and video decoder has associated therewith a memory for storing commands and status information for each command. The audio and video decoder is responsive to commands received from a host to control audio and video decoding processes. The audio and video decoder includes a host interface and a command processor. The command processor includes a transfer mechanism for transferring commands received at a command buffer in the memory to a command FIFO in the memory and a status monitor for tracking an execution status of each command stored in the command FIFO and for updating a status word which is stored along with each command in the command FIFO. The command processor returns a pointer to the host for a unique address in memory for the status word for each command stored in the command FIFO.

Preferred embodiments of the invention include the following features. The audio and video decoder includes a navigational data processor for processing navigational packs received as an input from a digital signal processor. The navigational processor stores the pack in an associated memory and generates an interrupt to the host upon receipt of a pack. The audio and video decoder further includes a dump data module for processing dump data commands received from the host and initiating collection of data from a digital signal processor without requiring host intervention. The dump data module generates an interrupt to the host upon completion of collection of data from the digital signal processor.

The audio and video decoder further includes a highlight module and a video display processor. The highlight module processes highlight commands received as an input from the host, identifying a portion of a sub-picture stream to highlight, and transferring a color selection to the video display processor for combining with a decoded video stream. The video display processor substitutes the color selection for a color originally designated for the portion of the sub-picture to be highlighted resulting in the display of the color selection for the portion of the sub-picture. The color selection is selected from the group of a selection color and an activation color. The video display processor overlays the color selection over a color originally designated for the portion of the sub-picture to be highlighted.

The audio and video decoder further includes a select stream module for processing select stream commands received as an input from the host. Each select stream command indicates a new stream of a predetermined type. The select stream module seamlessly shuts down the decoding of a stream having a same type as the new stream, reconfigures the decoders and processors within the audio and video decoder based on the new stream type and starts decoding of the new stream.

The audio and video decoder further including a memory interface for reading and writing commands and configuration data to and from the memory. The audio and video decoder is configurable based on parameters stored in the memory which are accessed through the memory interface. The host controls the configuration of the audio and video decoder by providing configuration parameters to the audio and video decoder which in turn stores them in the memory.

In another aspect, the invention provides an audio and video decoder for decoding audio, video and sub-picture streams in a disc player. The audio and video decoder has associated therewith a memory for storing commands and status information for each command. The audio and video decoder is responsive to commands received from a host to control audio and video decoding processes. The audio and video decoder includes a memory interface and a host interface. The host interface includes a host address bus, a host data bus, a plurality of host interface registers for storing address and data information received from the host, and host interface logic for controlling reading and writing operations to and from the host, the audio and video decoder and the memory. One of the host interface registers includes a pointer for designating the target and source of host write and read operations, respectively.

One advantage of the invention is that asynchronous communications between the host and the decoder in the command process may be realized. The host may issue commands and then perform other operations as required, yet may still track status of each command it issues to the decoder.

Another advantage of the invention is that a simple host interface to the decoder is provided thereby allow for easy command and configuration of the decoder.

Another advantage of the present invention is that the host may collect data via the decoder to DSP interface without requiring the host to oversee the transacation.

Another advantage of the present invention is that the host may easily retrieve navigational packs from the data input to the decoder and thereby simplifying host transactions with the disc player DSP.

Another advantage of the invention is the decoder includes simplified host and memory interfaces which allow for the easy configuration of the edecoder as it transitions from state to state in the decoding process.

Another advantage of the invention is the decoder is configurable via configuration parameters which are stored in a memory attached to the decoder. The decoder provides a easy interface to the host for writing configuration data to the memory. The memory is mapped to provide ready configuration of the decoder in its various operating states.

Other advantages and features will be apparent from the following description and claims.

BRIEF DESCRIPTION OF THE DRAWINGS

FIG. 1 is a block diagram of a DVD player according to one embodiment of the invention.

FIG. 2 is a functional block diagram of a DVD decoder according to one embodiment of the invention.

FIG. 3 is a block diagram of a bit stream and demultiplex module according to one embodiment of the invention.

FIG. 4 is a block diagram of a video decode module according to one embodiment of the invention.

FIG. 5 is a block diagram of an audio decode module according to one embodiment of the invention.

FIG. 6 is a block diagram of a configuration control and status module according to one embodiment of the invention.

FIG. 7 is a state diagram for the various operational states of a decoder according to one embodiment of the invention.

FIG. 8 is a block diagram of a host interface according to one embodiment of the invention.

FIG. 9 is a flow diagram for a method of executing commands according to one embodiment of the invention.

FIG. 10 is a memory map of a DRAM according to one embodiment of the invention.

DETAILED DESCRIPTION OF THE INVENTION

Referring now to FIG. 1, a DVD player 100 includes a disc reader mechanism 102, a DVD-DSP (digital signal processor) 104, a digital audio/video decoder 106, a microcontroller 108 and front panel 110.

Disc reader mechanism 102 includes a player servo controller 111, a photo diode reader 112, an amplifier 113 and a motor (not shown). Player servo controller 111 receives commands from DVD-DSP 104 for controlling the motor. The motor spins disc 120. A laser (not shown) within photo-diode reader 112 reads the information from the disc. The laser uses red light (as opposed to an audio CD player's infrared laser) for higher data density. Amplifier 113 amplifies the signal received from the photo diode reader 112, providing an audio/video input signal to DVD-DSP 104 for processing.

Associated with DVD-DSP 104 is a memory 122 for storing scratch pad information and other data. DVD-DSP 104 includes a stream data input interface for receiving data from amplifier 113, and an 8-bit parallel DVD-DSP interface and a constant rate serial CD DSP interface for communicating with decoder 106.

Digital audio/video decoder 106 reconstitutes the compressed data stored on the disc, converting the data into studio-quality video and CD-quality audio for output to television and stereo systems. Decoder 106 performs three primary functions: 1) separating and synchronizing audio and video data; 2) decoding the video data and formatting it for display on a television monitor; and 3) decoding the audio data and formatting it for amplification by a home audio system. In addition to these basic functions, the audio/video decoder may implement on-screen display (OSD) functions for graphics, encode the six-channel audio into Dolby ProLogic format and implement legacy formats such as VideoCD 2.0 and CD-Digital Audio. In one embodiment, decoder 106 includes a constant rate serial CD-DSP interface and an 8-bit parallel DVD-DSP interface for receiving data from DVD-DSP 104, a host interface for communicating with microcontroller 108, an audio output interface for outputting digital audio signals and a video output interface for outputting video output signals.

Memory 122 includes a dynamic random access memory (DRAM) 124 and ROM 115. Also associated with decoder 106 is an NTSC (National Television Systems Committee)/PAL (phase alternate line) encoder 116 and audio digital analog converter (DAC) 118.

DRAM 124 stores command and configuration data and provides buffer space for storing various portions of the video and audio stream as they are extracted from the input signal. ROM 115 stores microcode for operating decoder 106. NTSC/PAL encoder 116 receives as an input a digital video stream from decoder 106 and outputs a video output signal for transmission to a television monitor or other output device. In one embodiment, the output from NTSC/PAL encoder 116 is a composite video output signal. Audio DAC 118 receives a digital audio signal from decoder 106 and outputs an analog audio signal for transmission to an audio playback portion of the output device.

Microcontroller 108 controls the operation of player 100 translating user inputs from a remote control (not shown) or front panel 110 into commands for digital audio/video decoder 106, DVD-DSP 104 and disc reader mechanism 102. Microcontroller 108 is also responsible for implementing parental lockout, dialing distributors for access codes and controlling decryption.

In operation, a disc 120 is inserted into DVD player 100. In one embodiment, the DVD player 100 is configured to accept discs in the form of a digital video disc (DVD), a video compact disc (VCD), CDDA disc, photo CD disc, CD-I disc, or a laser disc. Associated with front panel 110 is a keypad (not shown) or other remote control input device (not shown), and a display (not shown). After inserting the disc into the DVD player, a user may use the keypad or remote control to execute a play command to activate the DVD player. The play command is passed from the front panel to microcontroller 108.

Microcontroller 108 communicates with DVD-DSP 104 which in turn sends a command to player servo controller 116 within disc reader mechanism 102. Photo diodes within photo diode reader 112 read information from the disc and transfer it to amplifier 113. The data is passed to DVD-DSP 104 which processes the input signal and outputs a stream of data to decoder 106. Microcontroller 108 issues a play command to decoder 106 which then processes the input stream from DVD-DSP 104 creating the video output and audio output for transfer to the NTSC/PAL encoder 116 and audio DAC 118, respectively. Encoder 116 outputs analog video for display by an analog video monitor (not shown). Audio DAC 118 simultaneously outputs the analog audio to the display device (video monitor). Alternatively, decoder 106 may output a digital audio signal.

Decoder 106 supports three main modes of operation: DVD MPEG-2 program stream mode, VCD CD-ROM sector MPEG-1 system stream mode, MPEG-1 system stream mode and CDDA mode. The mode is selected by setting a configuration parameter by microcontroller 108 (the configuration parameters are stored in DRAM 124) and issuing a "NewPlayMode" command from microcontroller 108 to decoder 106.

In the DVD MPEG-2 program stream mode, the source of input to decoder 106 is the 8-bit parallel DVD-DSP interface, or the microcontroller (host) interface. The input data from DVD-DSP 104 (or host) is an MPEG-2 program stream. The usual source for the MPEG-2 program stream bit stream is a DVD disc. At receipt of the program stream, the DVD microcode demultiplexes the 2,048 byte MPEG-2 program stream packs and manages the decoding process for a synchronized playback of one video, one audio and one sub-picture stream.

In the VCD-CD ROM sector MPEG-1 system stream mode, the source of the bit stream is the constant rate serial CD-DSP interface from DVD-DSP 104. Decoder 106 decodes CD ROM sector headers from the input data stream received at the CD DSP interface in addition to the MPEG-1 system stream. In addition, decoder 106 performs descrambling and error checking and demultiplexes the MPEG-1 system stream managing the decoding and synchronization of one video and one audio output stream.

In the MPEG-1 system stream mode, the source of the input bit stream is the host interface. The decoder demultiplexes the MPEG-1 system stream managing the decoding and synchronization of one video and one audio output stream.

In the CDDA mode, the source of the input bit stream to the decoder is the serial CD-DSP interface from DVD-DSP 104. Left and right CDVA 16-bit PCM audio samples are received through the CD-DSP interface and are passed to a buffer in DRAM 124. Various audio programming functions such as mute and emphasis may be performed in the buffer with the resulting data then passed to the audio output interface.

Referring now to FIGS. 1 and 2, a functional block diagram for decoder 106 is shown. A bitstream input and demultiplex module 200 receives the input compressed bitstream data from DVD-DSP 104 or microcontroller 108 and demultiplexes the data into its respective sub-pieces for storage in buffers in DRAM 124. Video and audio decode module 202 reads data from the DRAM buffers, decodes the MPEG bitstreams and processes the video, audio and sub-picture data. Video and audio output module 204 includes a video and audio interface for providing digital audio and compresses video to the audio DAC 118 and encoder 116, respectively. Finally, configuration and control status module 206 processes microcontroller 108 command and status requests and generates interrupts for service by microcontroller 108.

Bit Stream Input and Demultiplex Module

The bit stream input and demultiplexing processing involves collecting data from the current input, demultiplexing the input (a program or system stream) into elementary streams (video, audio, sub-picture and navigational streams) and discarding unwanted elementary streams. In addition, the bit stream demultiplex module must move the desired elementary stream data to an appropriate set of buffers in DRAM 124 for further processing.

Referring now to FIGS. 1 and 3, bit stream input and demultiplex module 200 includes a parallel interface 300 (8-bit parallel DVD-DSP interface), a serial interface 302 (constant rate serial CD-DSP interface), host interface 304, demultiplexor 306, and a FIFO (first in first out) buffer 308. The parallel interface 300 receives a DVD-DSP input stream from DVD-DSP 104. Similarly, the serial interface stream receives a CD-DSP serial input stream from DVD DSP 104. Host interface 304 receives a host processor stream from microcontroller 108. Demultiplexor 306 extracts the various sub-elements from the input data received and passes them to FIFO 308 for distribution to the appropriate portions of DRAM 124.

DRAM 124 includes a plurality of buffers for temporarily storing various sub-pieces of the data input stream. In particular, DRAM 124 includes a parameter buffer 124-1, video rate buffer 124-2, audio input buffer 124-3, sub-picture buffer 124-4, PCI (program control information) and DSI (data search information) buffer 124-5 and HLI (highlight information) buffer 124-6.

Specifically, when demultiplexing a DVD MPEG-2 program stream, DVD-DSP 104 outputs a parallel data stream which is received at parallel interface 300. Demultiplexor 306 extracts audio, video and sub-picture PTSs from the system header and places those into a parameter section of the DRAM (See FIG. 10.). In addition, demultiplexor 306 performs the following functions: extracts video elementary stream data and forwards it for storage in video rate buffer 124-2; extracts the audio elementary stream for storage in audio input buffer 124-3; extracts the sub-picture elementary stream for storage in sub-picture buffer 124-4; extracts PCI and DSI from the navigational elementary stream for storage in the PCI & DSI buffer 124-5; and, finally, extracts HLI from the navigational stream for storage in HLI buffer 124-6.

NAV PCK Capture

Input and demultiplex module 200 includes a NAVPACK processor 310 for off loading processing from the microcontroller. Data arrives at the decoder from DVD-DSP 104 on the parallel interface 300 in the form of Program Stream Packs, which contain for example, compressed audio, compressed video, and compressed sub-picture data. One other type of pack, called the "NAV_PCK", contains information required by the microcontroller to perform disk navigation operations.

To relieve the microcontroller from having to detect, demultiplex, and retrieve the NAV_PCK stream on its own, decoder 106 saves each NAV_PCK to DRAM (to the PCI & DSI buffer 124-5) as it arrives. NAVPACK processor alerts the microcontroller to the presence of a new NAV_PCK via an interrupt. Thereafter, the microcontroller can read the NAV_PCK data from DRAM as required.

This is a significant feature because, besides off-loading processing from the host microcontroller, it reduces system cost by eliminating the need for direct host access to the data stream during decoding. Furthermore, this feature allows the use of a wider variety of SD-DSP units on the market today.

Video and Audio Decode Module

Referring now to FIGS. 1, 4 and 5, video and audio decode module 202 includes a video decoder 400 and audio decoder 500. Video decoder 400 includes an MPEG video decoder 402 and a video display processor 404. Configuration parameters generated by microcontroller 108 are stored in parameter buffer 124-9 (see FIG. 10.). The configuration parameters configure MPEG video decoder 402 and video display processor 404. MPEG video decoder 402 decompresses the video elementary streams using the algorithms described in the ISO 11172 (MPEG-1) and ISO/IEC 13838 (MPEG-2) standards. MPEG video decoder 402 takes its inputs from the video rate buffer 124-2 in DRAM 124. The decoded luminance and chrominance samples are written to frame buffers 124-7 in DRAM 124 where they are displayed later by video display processor 404.

Video display processor 404 decodes the run length encoded bitstream stored in the sub-picture buffer 124-4 creating a 4-colored bitmap graphic image with 16 levels of fading factor and display resolution of up to 720×480 for NTSC systems and up to 720×576 for PAL systems. Finally, video display processor 404 processes on-screen display (OSD) data stored in on screen display buffer 124-8. The OSD data in the form of bitmaps or encoded data is written to the OSD buffer by microcontroller 108 through the host interface.

DVD highlight information (HLI) highlights one rectangular area in the sub-picture display area. In one embodiment, the sub-picture is divided into 36 rectangular regions, referred to as buttons, each of which may be highlighted in response to a host microcontroller command. HLI data includes presentation information and timing information. The presentation information describes the appearance of the highlight, that is, how the highlighted region of the sub-picture is to be changed from its original (non-highlighted) appearance. In one embodiment, the presentation information includes color data for defining a selection color and an activation color. The selection color is used when the button to be highlighted by the video display processor has been selected (e.g., single click of a mouse by a user). The activation color is used when the button to be highlighted has been activated (e.g., double click of a mouse by a user). The timing information includes timeouts for the highlight. When a button is selected by a user to be highlighted, the video display processor 404 substitutes the designated color data for the sub-picture region using the presentation information (button color information). The video display processor responds to host commands performing a sub-picture color substitution based on the data stored in the HLI buffer. Alternatively, the video display processor may overlay the presentation information over the original sub-picture color information.

In addition, video display processor 404 supports an on-screen display data format that includes bitmap 2-bit and 4-bit per pixel modes and a 4-bit run length encoded mode. The disc player is divided into rectangular OSD regions. In one embodiment, these OSD regions do not overlap vertically, meaning that any one horizontal line passes through only one OSD region. Video display processor 404 retrieves the OSD data from OSD data buffer 124-8 and manages the video output mixing for MPEG video, sub-picture, HLI, and OSD. OSD is superimposed over all other video sources. The sub-picture including the menu display or subtitle display has the next level of priority for display. Finally, the MPEG video has the lowest priority of display order.

Audio decoder 500 includes decoder 501, an audio input buffer 502 (in DRAM 124), an audio output buffer 504 (in DRAM 124), and IEC-958 output processor 506 and a 2 or 6-channel output processor 508. Audio decoder 500 supports 2 sets of audio outputs, 3 left-right decoder channels, and 1 IEC-958 port. Accordingly, it supports 2-channel stereo, 6-channel surround sound, and IEC-958 compressed or uncompressed audio output. Audio input buffer 502 receives the MPEG-1 layer 1 and 2 audio bitstreams. Decoder 501 parses the audio header information and processes and stores it in audio output buffer 504. The resultant audio information is then converted to audio samples by either IEC-958 output processor 506 or the 2- or 6-channel output processor 508, respectively.

Video and Audio Output Module

Referring now to FIGS. 4 and 5, video and audio output module 204 includes a video interface 450, an IEC-958 interface 550 and a left-right interface 552. Video interface 450 receives compressed video data and transfers it to an external NTSC/PAL encoder 116. The encoder processes the digital video stream and outputs a composite video output signal for transmission to a television monitor 127 or other output device. IEC-958 output processor 506 provides an audio input signal for transmission through IEC-958 interface 550 to an external decoder 129. Similarly, 2 or 6 channel output processor 508 provides and analog audio signal through left-right interface 552 to audio DAC 118.

Configuration Control and Status Module Referring now to FIGS. 1 and 6, configuration control and status module 206 includes a command processor 600 including transfer mechanism 610 and status monitor 612, interrupt processor 602, host interface 604 and DRAM interface 606. The configuration status and control module receives host commands, and configures the various sub-pieces of the decoder based on the mode selected by a user.

Referring now to FIGS. 1 and 7, decoder 106 operates in one of seven possible internal processing states. The processing state determines how commands are interpreted and how the decoder and the display processes operate. State transitions occur as a result of command execution and system evolution.

Initialization state 750 is entered in response to a reset command or initial software load. From this state the decoder 106 reads the configuration parameters (which are set by microcontroller 108 and stored in DRAM 124) and uses these values to completely initialize the hardware and software. During the initialization state, no external data or commands are accepted and, if data or commands are sent during this time, the result will be unpredictable. By completion of the initialization procedure, decoder 106 transitions to idle state 752.

Idle state 752 is a wait state, in which decoder 106 will stay indefinitely until a microcontroller command causes a state transition. While in this state, no decoding operations take place. The video output is left undisturbed. In addition, the audio output continues as long as there still is data in the audio output buffer. Idle state 752 is the normal non-processor state of decoder 106. In this state, it is assumed that the DVD input buffers are empty and that the data input is turned off. Decoder 106 is placed in the Idle state to let the microcontroller (host) perform other tasks prior to issuing a play type command or may be part of a transition between a series of commands.

Play state 754 is the normal video/audio/sub-picture decoding state. In this state, video and sub-picture decode and display as wells as audio decode and output occurs (depending on the contents of the input buffers and the configuration parameters). Upon entering this mode, the decoder remains in the play state indefinitely until the host issues another command or an error occurs which causes a state transition or other system evolution.

Pause state 756 is similar to idle state 752 in that no processing or data input or output occurs. However, in pause state 756 it is assumed that the input buffers can contain valid data which will need to be decoded and outputted sometime in the future. Thus, entering pause state 756 suspends but does not terminate the processing of input data. If a resume command is issued while in the pause state, the playback may resume seamlessly. While in this state, no decoding operations take place. The video and sub-picture output is left undisturbed. The audio continues as long as there is still data in the audio output buffer.

Scan state 758 is entered only when a scan command is processed and the skip arguments of the scan command is not equal to one. The "scan mode" and "skip" arguments of the scan command determine the behavior of scan state 758. In the special case of skip equals negative one (—1), the scan operator terminates after the first "I" (Intra) picture, at which point the pause state is entered. If the skip argument is non-negative, then the scan state is entered. In the scan state, only video decoding and output including sub-picture decoding and output is performed. Some or all audio output is discarded and no audio video synchronization is performed. Depending on the skip in the scan mode arguments in the scan command, video decoding is performed on only "I" or "IP" (Intra or Predicted) pictures; "B" (Bi-directionally Predicted) pictures are always discarded. This operation continues indefinitely until a host command or error causes a state transition out of the scan state.

Freeze state 760 is entered only when a freeze command is processed by decoder 106. In this state, the last display picture is frozen on the display, and sub-picture data continues to be decoded but not displayed. All other data is discarded. OSD will be displayed if it is enabled by microcontroller 108. Audio data continues to be decoded but audio/video synchronization is not performed. The decoder remains in this state until another host command is processed or an error causing a state transition occurs.

Slow motion state 762 is entered only when a slow motion command is processed by decoder 106. Microcontroller 108 controls the slow motion display through parameter fields stored in DRAM 124 which are retrieved by decoder 106 to set the delay time between each frame decode and display. In this state, the audio decoding output is disabled. The video decoding display is slowed down by repeating each frame a specified number of times.

Host Interface

Referring again to FIGS. 1 and 6, host interface 604 provides a simple, efficient and low cost interface to microcontroller 108. The host interface provides for operational communications between microcontroller 108 and decoder 106. In addition, the host interface includes a compressed data input to decoder 108. Through the host interface, microcontroller 108 may initialize decoder 106, download microcode, issue commands, monitor status, or download an OSD bitmap.

The host interface supports two types of read/write protocols: individual mode ("I mode"), and multiplexed mode ("M mode"). In the I mode, the decoder requires the host to drive separate read and write ($\overline{RD}$ and $\overline{WR}$) signals to indicate whether a particular transfer is a read or write. In the M mode, the decoder only requires a single signal (R/$\overline{W}$).

Referring now to FIGS. 1 and 8, host interface 604 includes a set of eight byte-wide host I/O registers (HI00–HI07) for allowing access to the decoder's DRAM 124, ROM 115 or internal bus register 800 via internal bus 806, host interface control logic 802, and data input control logic 804. When the host transfers compressed data, the host interface receives it on the HDATA lines [7:0] and passes the data to bitstream and multiplex module 200. The HADDR [2:0] lines select the particular host I/O register being accessed.

M Mode Host Write

An M mode write begins when microcontroller 108 drives R/$\overline{W}$ LOW to indicate a write operation. Simultaneously, it also drives the three-bit HIOX Register address (HIO0–HI07) onto HADDR[2:0] and the write data onto HDATA[7:0]. When HADDR, HDATA, and R/$\overline{W}$ are stable, microcontroller 108 asserts CS, which causes the decoder 106 to latch these signals.

In response to the assertion of $\overline{CS}$, the decoder asserts $\overline{WAIT}$. It holds $\overline{WAIT}$ asserted until it is ready to complete the transfer. When decoder 106 is ready to read the data, it 3-states $\overline{WAIT}$, which is pulled HIGH by an external pull-up resistor. (The rise time of $\overline{WAIT}$ is determined by the value of the resistor.)

In response to the deassertion of $\overline{WAIT}$, microcontroller 108 deasserts $\overline{CS}$. The deassertion of $\overline{CS}$ causes the decoder 106 to latch the write data into the target register.

I Mode Host Write

An I mode write begins when microcontroller 108 asserts $\overline{CS}$, which causes the decoder 106 to assert $\overline{WAIT}$. Microcontroller 108 also drives the three-bit HIOX Register address (HIO0–HI07) onto HADDR[2:0].

In response to the assertion of $\overline{WAIT}$, microcontroller 108 asserts $\overline{WR}$ to indicate a write operation and that HADDR is stable. When the decoder is ready to read data, it 3-states $\overline{WAIT}$, which is pulled HIGH by an external pull-up resistor. (The rise time of $\overline{WAIT}$ is determined by the value of the resistor.)

In response to $\overline{WAIT}$ going HIGH, the microcontroller 108 deasserts $\overline{WR}$. On the rising edge of $\overline{WR}$, the decoder writes data into the HIM register. Microcontroller 108 deasserts $\overline{CS}$ to end the write operation.

M Mode Host Read

An M mode read begins when microcontroller 108 drives R/$\overline{W}$ HIGH to indicate a read operation. It also drives the three-bit HIOX Register address (HIO0–HI07) onto HADDR[2:0]. When HADDR is stable, microcontroller 108 asserts $\overline{CS}$.

In response to the assertion of $\overline{CS}$, the decoder asserts $\overline{WAIT}$. The decoder 106 3-state when the data is stable on HDATA[7:0]. $\overline{WAIT}$ is pulled HIGH by an external pull-up-resistor. (The risetime of $\overline{WAIT}$ is determined by the value of the resistor.)

Microcontroller 108 deasserts $\overline{CS}$ when it has read the data. In response to the deassertion of $\overline{CS}$, the decoder 106 3-states HDATA[7:0].

I Mode Host Read

An I mode write begins when microcontroller 108 asserts $\overline{CS}$, which causes the decoder 106 to assert $\overline{WAIT}$. Microcontroller 108 also drives the three-bit H1OX Register address (H1O0–HI07) onto HADDR[2:0]. When HADDR is stable, the microcontroller 108 asserts $\overline{RD}$.

Decoder 106 3-states $\overline{WAIT}$ when the data is stable on HDATA[7:0]. $\overline{WAIT}$ is pulled HIGH by an external pull-up resistor. (The risetime of $\overline{WAIT}$ is determined by the value of the resistor.)

In response to $\overline{WAIT}$ going HIGH, microcontroller 108 deasserts $\overline{RD}$. On the rising edge of $\overline{RD}$, the decoder indicates that data is ready for the microcontroller 108 to read on HDATA. Microcontroller 108 deasserts $\overline{CS}$ to end the read, which causes the decoder 106 to 3-state HDATA.

The host I/O registers are used to access local DRAM, ROM and internal bus register. The configuration of the host I/O registers is as is shown in Table 1.

TABLE 1

| Address HADDR[2:0] | Register Name | Contents |
| --- | --- | --- |
| 000 | Memory Data Register 0 (HIO0) | Memory Data, byte 0 (LSB) |
| 001 | Memory Data Register 1 (HIO1) | Memory Data, byte 1 |
| 010 | Memory Data Register 2 (HIO2) | Memory Data, byte 2 |
| 011 | Memory Data Register 3 (HIO3) | Memory Data, byte 3 (MSB) |
| 100 | Memory Address Register 0 (HIO4) | Memory Address, byte 0 (LSB) |
| 101 | Memory Address Register 1 (HIO5) | Memory Address, byte 1 |
| 110 | Memory Address Register 2 (HIO6) | Memory Address, byte 2 (MSB) |
| 111 | Memory Mode Register (HIO7) | Memory Mode |

The four memory data registers HI00 through HI03 comprise the 32-bit data that the host reads or writes. Memory address registers HI04 through HI06 comprise 24 bit DRAM, ROM or internal bus register address. The two most significant bits of HI06 indicate the transfer target of the read or write request (00 to DRAM, 01 to ROM, 10 to internal bus registers, and 11 is reserved).

Register HI07 is the memory mode manager and controls or indicates the status of the host interface.

Bit 7 is a data request bit and indicates whether the decoder is ready to accept compressed data from the microcontroller.

Bit 6 is a compressed data on bit which controls how the decoder handles writes to the HI00 register. If the bit is set to zero ("0"), normal I mode writes are performed to registers HI00–HI03. If the bit is set to a one ("1"), then the microcontroller writes compressed data to only register HI00.

Bit 3 is an auto-increment address bit and controls the auto increment address mode. When this bit is set the decoder automatically increments memory address bits [7:2] to allow the microcontroller a data block of up to 64 words writing a new address into the memory address registers. When auto-incrementing is enabled, each 32-bit transfer between the microcontroller and the decoder causes the HI04 register portion of the address to be incremented to the next word (not byte).

The host interface internal bus register ("host control register")is accessible from the decoders internal bus. In one embodiment the host control register is 32 bits in size and includes the following parameters:

Local state bits [23:22] to set the local state of the decoder.

Shutdown decoder [12]. When the microcontroller sets this bit to zero ("0"), the decoder tri-states all of its output signals.

Host to encoder interrupt enable [bit 7]. When enabled (set to a one "1"), this bit enables the host to write an interrupt (set bit 6 in the host control register) to the decoder.

Host to decoder interrupt bit [6]. After the host has set the enable, this bit indicates an interrupt to decoder.

Decoder to host interrupt enable [1]. This bit enables the decoder to write an interrupt to the host (enabling the writing of bit 0 to the host control register).

Decoder to host interrupt [0]. The decoder sets this bit to issue an interrupt to the microcontroller.

In the host interface there is a single output interrupt pin. An interrupt status word containing a bit corresponding to each host interrupt is stored in DRAM. A mask function allows the host to selectively enable interrupts by setting bits and disable interrupts by clearing bits in an interrupt mask stored in DRAM. When an interrupt event occurs, the decoder checks to determine if the particular interrupt is enabled (of interest to the host), and then if so, sets the appropriate bits in the interrupt status word. Thereafter, the interrupt pin is asserted by the decoder generating an interrupt to the microcontroller. The microcontroller services all interrupts indicated by the interrupt status field before clearing the decoder interrupt.

Command and Status

Referring again to FIGS. 1 and 6, DRAM 124 includes a command buffer 124-10 and a command FIFO (command and status buffer) 124-11. Command buffer 124-10 is used to store a single command received from microcontroller 108. In addition, command buffer 124-10 includes a status pointer 712. Status pointer 712 is used to store a pointer (the "status address") to the location in command FIFO 124-11 where the status of a particular command (the "command status word") is stored. Command FIFO 124-11 is used to store commands 710 and command status words 711 associated with the commands. Command FIFO 124-11 is sized to store a plurality of commands 710. In one embodiment of the present invention, command buffer 124-10 is sized to store up to eight commands.

Host commands are the primary means by which microcontroller 108 controls decoder 106. In one embodiment, two sets of commands are available in the application program interface. A set of DVD 1 commands provide access to the full capabilities of decoder 106 for decoding DVD, video CD, and CD-DA disc. A second set of commands is available for backward compatibility to a CL-480 decoder, a previous generation decoder manufactured by C-Cube, Inc., San Jose, Calif.

To issue a command, microcontroller 108 writes the command and its parameters to command buffer 124-10 of DRAM 124 associated with decoder 106. In addition to the command and its parameters, microcontroller 108 writes a zero value entry into status pointer 712. Command processor 600 checks the command buffer for new commands periodically, and processes commands in the FIFO in the order received. Alternatively, microcontroller 108 may generate an interrupt to decoder 106 for servicing of the command. Upon receipt of an interrupt from the host, command processor 600 immediately processes the new command.

When the microcontroller issues a command (a new command) to decoder 106, the microcontroller receives back a unique status address for each command issued. The status address indicates the location in DRAM at which a command status word associated with the last command (the command prior to the "new command") issued by microcontroller 108 is located.

In one embodiment, writing of commands to microcontroller 108 is triggered by the return of a non-zero entry (the address of a pointer) to status pointer 712. Specifically, transfer mechanism 610 within command processor 600 acknowledges the receipt of a command in the command buffer by allocating a location in the command FIFO for storing both the new command and status information associated with the new command. Transfer mechanism 610 transfers the command from the command buffer to the command FIFO. Thereafter, status address is written by command processor 600 into the status pointer 712 of DRAM 124. Status monitor 612 maintains the current status for each command updating the status word as required during the time the command is stored in the command FIFO.

The status pointer may be read at anytime by microcontroller 108. Accordingly, microcontroller 108 is not required to wait for the return of the status address for a given command, and instead may perform other operations. At the time for issuing a next command, the status address may be retrieved for the last command. Thus, the command issuing process may be performed in a true asynchronous fashion wherein microcontroller 108 is free to execute other functions and is not required to wait for the immediate return of a status address. Microcontroller 108 may monitor the value of status pointer 612, and upon the determining that the status pointer includes non-zero data, microcontroller 108 may issue a next command for processing.

In one embodiment of the present invention, microcontroller 108 may issue two types of commands: high priority commands and low priority commands. Low priority commands are transferred to command FIFO 124-11 and thereafter are processed in the order they are received when the resources for processing the commands are available. High priority commands are executed immediately, and not transferred to the command FIFO. In one embodiment of the present invention, command FIFO 124-11 stores up to eight (8) low priority commands. In one embodiment of the present invention, high priority commands are not stored in the buffer. In this embodiment, microcontroller 108 must wait until the current high priority command has been executed prior to issuing a next high priority command. Examples of high priority commands are "reset", "abort", and "flush buffer". Examples of low priority commands are "play", "scan", and "slow-mo".

Low priority commands require control of shared resources on the decoder, and therefore are scheduled to run in the background. But the background schedule performs other tasks in addition to the command processing and it is possible that some of these other tasks will stall. In particular, if the decoder is in the middle of decoding a video frame and runs out of data, the decoder will stall until the data stream continues or the task is aborted.

The purpose of high priority commands is to allow the microcontroller 108 to abort a stalled command without supplying additional data. High priority commands are guaranteed to execute without delay, regardless of the state of the background processing. In summary, all normal functions of the decoder are implemented as low priority commands which are scheduled to run in the background between the decoding frames of video and audio. A small number of functions are provided as high priority commands, so that the host processor may gracefully abort any command in process and restart from a well defined state.

Referring now to FIGS. 1 and 9, in a method of executing commands by a decoder, the decoder receives a first command from microcontroller 108 at a command buffer (900). The microcontroller 108 may wait for regular service (performed during the periodic check by the decoder of the command buffer) or, alternatively, the microcontroller 108 may issue an interrupt to the decoder to trigger the immediate servicing of the new command in the command buffer. A check is made to determine if the command received is a high or low priority command (902).

If the command is a high priority command, then the decoder allocates a space in memory for storing status information associated with the high priority command (904) and transfers the address of this location to the status pointer in the command buffer (906). The address for the high priority command status is returned to the status pointer so that the microcontroller may track the status of the high priority command. Thereafter, the decoder executes the command (908). In one embodiment, the decoder is disabled from receiving any other high priority commands until the first high priority command has completed execution. Alternatively, microcontroller 108 may be configured so as to only issue a single high priority command at a time. In an alternative embodiment, a plurality of high priority commands may be buffered in memory, returning the starting address associated with the status word for each high priority command just as performed in the low priority command process, as described in greater detail below.

If the command received is a low priority command, a check is made to determine if the command FIFO is full (910). If the command FIFO is full, then the decoder waits until there is space in the command FIFO before returning the status address for the last command (912). If the command FIFO is not full, the decoder allocates a location in the command FIFO for storing status information (a "command status word") associated with the new command (914). The decoder copies the command into the command FIFO and the command is executed as resources become available (916). Finally, the decoder writes the address (the "status address") associated with the location allocated in step 914 to the status pointer (918).

The command status word provides status information to the microcontroller to allow the microcontroller track the execution of a command. Taking advantage of the features described above, microcontroller 108 may issue a command, then perform some other function. At a later time, microcontroller 108 may check on the status of the command before deciding what to do next. Ordinarily maintenance of command status is complicated by the fact that the host processor can issue a sequence of low priority commands without waiting for any of them to execute, so long as there is room in the internal command FIFO. To deal with this, decoder 106 maintains a separate status word for each command in the command FIFO. This allows the host to follow the status of each individual command, even when the host issues a series of commands without waiting for any of them to execute.

In the illustrated embodiment, the values of the command status word stored in the command FIFO include: (0) meaning that the command is in the initialization stage; (1) meaning the command has been copied into the command FIFO; (2) meaning the command passed all the syntax checks and is being processed; (3) meaning the command is in a ready state (this is used for indefinite duration commands); (4) meaning the command is done; and, (5) meaning the command is incorrect because it was issued from the wrong processing state, has incorrect parameter values or has encountered some other error.

The valid period of the command status word begins at the time the status address is returned to the microcontroller 108, and it ends when the next command is issued. A command is defined as finished when it has a status of either "3" (it becomes steady state) or "4" (it is done).

Special Function and Commands

Referring again to FIGS. 1 and 6, command processor 600 within decoder 106 includes a dump data module 614, a highlight module 616, and select stream module 618 for processing "dump data", "highlight" and "select stream" commands, respectively.

Dump Data Processing

Dump data module 614 allows the decoder to collect data directly from the SD-DSP interface (from the DVD-DSP), off-loading this task from the host microcontroller. Rather than collecting data from the SD-DSP interface itself, the host microcontroller need only issue a "DumpData$_{13}$ DVD" command and start the data flow. Dump data module 614 processes the command from the microcontroller and enables the transfer of the raw incoming data from the input and demultiplex module to the video rate buffer in DRAM and alerts the host when the transfer is complete. In one embodiment, transfers are limited to 100 sectors of data, with each sector sized at 2048 bytes. Dump data module 614 generates an interrupt to the microcontroller at the end of a transfer. The host can then access this data without further interaction with the data source by directly reading the data from DRAM.

Highlight Processing

Highlighting is feature unique to the DVD standard. Combined with another DVD-unique feature called sub-pictures, it allows interactive buttons and menus to be authored into the data. The user then interacts with the system by selecting and/or activating buttons displayed on the video output. For a given menu, the DVD standard allows up to three different sets of buttons to be authored into the data in order to display menus consistently across different output display formats.

As was described above, highlight information is part of the navigational stream. The demultiplexor in the input and demultiplex module separates this information out and stores it in HLI buffer. A highlight command allows very efficient button selection and activation by the host. Most highlight information is read directly from the data stream received by the decoder. A host supplies only the button number to highlight and a flag that indicates whether the button should display the selection or activation color. Highlight module 616 receives a highlight command, and determines which button group (in the sub-picture display region) is indicated. Thereafter, highlight module 616 passes the appropriate highlight definition (sub-picture location and color selection) to the video display processor for combining with the final video output.

Highlight module 616 informs the microcontroller when an activation highlight is displayed by means of an interrupt. Auxiliary information accompanying the interrupt indicates the number of the button that was activated so the microcontroller need not keep track of the button number itself.

Select Stream Processing

The DVD standard allows for up to 8 different audio streams, and up to 32 different sub-picture steams. In addition, DVD audio format may be Dolby Digital, MPEG, or LPCM. The VCD standard furthermore allows for up to 3 deferent video streams.

A "SelectStream" command allows on-the-fly switching of audio, video, and sub-picture streams. On-the-fly means that an individual stream may be selected even while audio/video/sub-picture playback is occurring, with minimal impact to output quality. Audio stream switching by Select-Stream also may be used to switch audio decoders on-the-fly, so the user my switch, for example, from a Dolby Digital audio stream to an LPCM audio stream, without significantly impacting concurrent audio/video/sub-picture playback.

Select stream module 618 within decoder 106 accomplishes the seamless switching by initially shutting down the current decode operation for the designated stream type (e.g., shuts down the decoding of the previously selected audio stream if a new audio stream is indicated). Thereafter, select stream module 618 reconfigures the demultiplexor in the input and demultiplex module for the new stream format and the decoders (audio and video) as appropriate. Finally, select stream module 618 restarts the decode process.

Configuration Parameters

Configuration parameters associated with digital audio/video decoder 106 are stored in DRAM 124. These parameters are used by the microcontroller 108 to configure decoder 106 for different modes of operation. The decoder's DRAM Configuration Parameters were chosen very carefully to ensure a clean, consistent and efficient means to configure the decoder.

Microcontroller 108 configures the decoder by writing the parameter information into DRAM via the host interface. A memory map of parameter types and locations in memory is shown in FIG. 10. At initialization and during configuration (and at each reconfiguration) of the decoders and processors within decoder 106, parameter information is loaded from DRAM 124 by performing a read operation through the DRAM interface. A list of configuration parameters and a description thereof is provided in Tables 2-1 through 2-8.

TABLE 2-1

Memory Parameters

| Parameter (byte addrr) | Description |
|---|---|
| ROM_INFO (0x60) | Used to configure the decoder's ROM size, width and speed. |
| DRAM_INFO (Sx68) | 16 Mbits, in increments of 4 Mbits. The maximum DRAM configuration is 32 Mbits. |
| UCODE_MEMORY (0x6C) | This parameter indicates whether the microcode is stored in DRAM or ROM prior to bootstrap execution. |
| IC_TYPE (0x70) | This parameter sets the type of IC. |

TABLE 2-2

Video Parameters

| Parameter (byte addrr) | Description |
|---|---|
| VIDEO_MODE (0x7C) | This parameter specifies information about the video hardware interface to the NTSC/PAL encoder. |
| DISPLAY_ASPECT_RATIO (0x80) | This parameter specifies the aspect ratio of the display device so the decoder can output video at the desired aspect ratio. |
| ASPECT_RATIO_MODE (0x84) | This parameter specifies the desired format when the aspect ratio of the input bitstream is 16:9 and the display device is 4:3. |
| PAN_SCAN_SOURCE (0x88) | This parameter indicates to the microcode whether to use panscan vectors from the bitstream or from the host processor. |
| PAN_SCAN_HORIZONTAL_OFFSET (0x8C) | This parameter specifies the pan-scan horizontal vector to be used in displaying a 16:9 input on a 4:3 output device. |
| TOP_BORDER (0x94) | This parameters specifies the number of blank lines between the start of the VSYNC pulse and the first line of the display. |
| LETTERBOX_COLOR (0x98) | This parameter specifies the luminance (Y) and chrominance (Cb and Cr) values of the color used for the border. |
| BACKGROUND_COLOR (0x9C) | This parameter specifies the luminance (Y) and chrominance (Cb and Cr) values of the color used by Play() and Fade(). |
| OSD_EVEN_FIELD (0xA0) | If this parameter is zero, then OSD is disabled. Otherwise, it contains a pointer to the first OSD block header for the top field. |
| OSD_ODD_FIELD (0xA4) | This parameter contains a pointer to the first OSD block header for the bottom (odd or 1) field. |

TABLE 2-3

Error Concealment Parameters

| Parameter (byte addrr) | Description |
| --- | --- |
| STILL_MODE (0xA8) | This parameter selects whether the decoder blanks the video output before displaying the next still picture. |
| STILL_DEF_HSIZE (0xAC) | This parameter specifies the default value of the horizontal size for still pictures. |
| STILL_DEF_VSIZE (0xB0) | This parameter specifies the default value of the vertical size for still pictures. |
| ERR_CONCEALMENT_LEVEL (0xB4) | This parameter specifies the video error recovery level. |
| ERR_HORIZONTAL_SIZE (0xB8) ERR_VERTICAL_SIZE (0xBC) ERR_ASPECT_RATIO_INFO (0xC0) ERR_FRAME_RATE_CODE (0xC4) | These parameters—ERR_HORIZONTAL_SIZE, ERR_VERTICAL_SIZE, ERR_ASPECT_RATIO_INFO, and ERR_FRAME_RATE_CODE—specify the values to use for the corresponding fields of the MPEG-1/2 sequence header if the first sequence header contains an error. |

TABLE 2-4

Audio Parameters

| Parameter (byte addrr) | Description |
| --- | --- |
| AUDIO_CONFIG (0xE0) | This parameter configures how the decoder's audio interface outputs audio data. |
| AUDIO_DAC_MODE (0xE8) | The host writes this parameter to configure how the decoder hardware outputs to the audio DAC. |
| AUDIO_CLOCK_SELECTION (0xEC) | The host writes this parameter to select the frequency division of the audio clock. |
| IEC_958_DELAY (0xF0) | This parameter (must be a positive number) is used to set the delay for audio data being sent out the IEC-958 port. |
| AUDIO_ATTENUATION (0xF4) | This field specifies the attenuation to be used for the audio output. |

TABLE 2-5

Dolby Digital (AC-3) Parameters

| Parameter (byte addrr) | Description |
| --- | --- |
| AC3_OUTPUT_MODE (0x110) | This field specifies the number and configuration of speakers connected to the audio L/R channels. |
| AC3_OPERATIONAL_MODE (0x114) | This parameter specifies a new operational mode. |
| AC3_LOW_BOOST (0x118) | This parameter specifies the low boost value used for compression scaling. |
| AC3_HIGH_CUT (0x11C) | This parameter specifies the high cut value used for compression scaling. |
| AC3_PCM_SCALE_FACTOR (0x120) | This parameter specifies the scale factor for PCM output on all channels. |
| LFE_OUTPUT_ENABLE (0x124) | This parameter specifies whether or not the low-frequency effects are enabled. |
| AC3_VOICE_SELECT (0x128) | This parameter allows the host to select whether the decoder reproduces one, both, or none of the V channels. |

TABLE 2-6

Play Mode Parameters

| Parameter (byte addrr) | Description |
| --- | --- |
| STREAM_TYPE (0x1A0) | This parameter is used to configure the decoder's microcode for a specific type of decoding operation. |
| STREAM_SOURCE (0x1A4) | This parameter is used to configure the decoder hardware to receive data in the CFIFO from one of three possible sources as listed. |
| SD_MODE (0x1A8) | This parameter is used to configure how the decoder hardware sets up the DVD (also known as SD) interface. |
| CD_MODE (0x1AC) | This parameter is used to configure how the decoder sets up the CD interface. |
| AV_SYNC_MODE (0x1B0) | This parameter specifies how audio/video synchronization is to be performed. |
| VIDEO_PTS_SKIP_INTERVAL (0x1B8) | The synchronization code reads this parameter to determine when video pictures should be skipped. |
| VIDEO_PTS_REPEAT_INTERVAL (0x1BC) | The synchronization code reads this parameter to determine when video pictures should be repeated. |
| AUTOPAUSE_ENABLE (0x1D4) | Autopause enable. |

TABLE 2-7

Host Parameters

| Parameter (byte addrr) | Description |
| --- | --- |
| INT_MASK (0x200) | This parameter is used as a mask to selectively enable or disable individual host interrupts. |
| RDY_S_THRESHOLD_LOW (0x208) | This parameter is used by the RDY-S host interrupt in VCD mode only. |

TABLE 2-8

Pointers

| Parameter (byte addrr) | Description |
| --- | --- |
| MEMORY_MAP (0x21C) | This parameter configures whether the decoder outputs for NTSC or PAL systems. |
| PCI_BUFFER_START (0x220) PCI_BUFFER_END (0x224) | These pointers define the start and end addresses of the Presentation Control Information (PCI) buffer for the DVD player. |
| DSI_BUFFER_START (0x228) DSI_BUFFER_END (0x22C) | These pointers define the start and end addresses of the Data Sequence Information (DSI) buffer. |
| USER_DATA_BUFFER_START (0x270) USER_DATA_BUFFER_END (0x274) | These pointers define the start and end addresses of the user data buffer. |
| USER_DATA_READ (0x278) USER_DATA_WRITE (0x27C) | These two locations contain the read and write pointers for the User Data FIFO. |
| DUMP_DATA_BUFFER_START (0x280) DUMP_DATA_BUFFER_END (0x284) | These pointers define the start and end addresses of the Dumpdata buffer. |
| SUBPICTURE_PALETTE_START (0x288) SUBPICTURE_PALETTE_END (0x28C) | These pointers define the start and end addresses of the sub-picture palette buffer. |

The present invention has been described in terms of specific embodiments, which are illustrative of the invention and not to be construed as limiting. Other embodiments are within the scope of the following claims.

What is claimed is:

1. An audio and video decoder for decoding audio and video streams, the audio and video decoder responsive to commands received from a host to control audio and video decoding processes, the audio and video decoder comprising:
   a host interface; and
   a command processor including a command and status buffer for storing selected ones of the commands received from the host through the host interface, the command processor operable to:
      allocate space in the command and status buffer to store a command status word representative of an execution status of each command stored therein,
      return a command status pointer to the host representing a location in a memory for the command status word for each command before accepting a new command from the host,
      monitor the execution status for each command and update the command status word for each command based on the execution status, and
      execute each command from the command and status buffer according to an order in which each command is received.

2. An audio and video decoder for decoding audio, video and sub-picture streams in a disc player, the audio and video decoder responsive to commands received from a host to control audio and video decoding processes, the audio and video decoder comprising:
   a host interface for interfacing a command processor and the host;
   a command FIFO for storing the commands and command status words, each command status word reflecting a current execution status of an associated command; and
   the command processor including
      a transfer mechanism for transferring the commands received from the host via the host interface to the command FIFO, and
      a status monitor for tracking an execution status of each command stored in the command FIFO and for updating a status word stored along with each command in the command FIFO,
      wherein the command processor returns to the host, for each command stored in the command FIFO, a command status pointer for a unique address for the status word associated with each command before accepting a new command from the host.

3. The audio and video decoder of claim 2 further including a navigational data processor for processing navigational packs received as an input from a digital signal processor and for storing the navigational packs in an associated memory, the navigational data processor generating an interrupt to the host upon receipt of each navigational pack.

4. The audio and video decoder of claim 2 further including a dump data module for processing dump data commands received from the host and initiating collection of data from a digital signal processor without requiring host intervention, the dump data module generating an interrupt to the host upon completion of collection of data from the digital signal processor.

5. The audio and video decoder of claim 2 further including a highlight module and a video display processor, the highlight module for processing highlight commands received as an input from the host, for identifying a portion of a sub-picture stream to highlight, and for transferring a color selection to the video display processor for combining with a decoded video stream.

6. The audio and video decoder of claim 5 wherein the video display processor substitutes the color selection for a color originally designated for the portion of the sub-picture to be highlighted resulting in a display of the color selection for the portion of the sub-picture.

7. The audio and video decoder of claim 6 wherein the color selection is selected from a group of colors consisting a selection color and an activation color.

8. The audio and video decoder of claim 5 wherein the video display processor overlays the color selection over a color originally designated for the portion of the sub-picture to be highlighted.

9. The audio and video decoder of claim 2 further including a select stream module for processing select stream commands received as an input from the host, each select stream command indicating a new stream of a predetermined type, the select stream module for seamlessly shutting down the decoding of a stream having a same type as the new stream, for reconfiguring decoders and processors within the audio and video decoder based on the new stream type and for starting decoding of the new stream.

10. The audio and video decoder of claim 2 further including a memory interface for reading and writing the commands and configuration data to and from the memory, the audio and video decoder configurable based on parameters stored in the memory which are accessed through the memory interface, the host controlling a configuration of the audio and video decoder by providing configuration parameters to the audio and video decoder which in turn stores the configuration parameters in the memory.

11. An audio and video decoder for decoding audio, video and sub-picture streams in a disc player, the audio and video decoder comprising:
   a memory interface for interfacing a command processor and a memory;
   the command processor responsive to commands received from a host to control audio and video decoding processes and including the memory for storing commands and status information for each command, the command processor is operable to return to the host, for each command received, a command status pointer to a location in the memory for a command status word indicative of a status of an associated command before accepting a new command from the host; and
   a host interface including a host address bus, a host data bus, a plurality of host interface registers for storing address and data information received from the host, host interface logic for controlling reading and writing operations to and from the host, the audio and video decoder and the memory, where one of the host interface registers includes a pointer for designating a target and a source of host write and read operations, respectively.

* * * * *